(12) United States Patent
Mukkavilli

(10) Patent No.: US 7,661,097 B2
(45) Date of Patent: Feb. 9, 2010

(54) METHOD AND SYSTEM FOR ANALYZING SOURCE CODE

(75) Inventor: Lakshmankumar Mukkavilli, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 542 days.

(21) Appl. No.: 11/099,821

(22) Filed: Apr. 5, 2005

(65) Prior Publication Data

US 2006/0225056 A1   Oct. 5, 2006

(51) Int. Cl.
    *G06F 9/45* (2006.01)

(52) U.S. Cl. .................. 717/143; 717/152; 717/154

(58) Field of Classification Search ......... 717/124–126, 717/133, 141–144, 154–157
    See application file for complete search history.

(56) References Cited

U.S. PATENT DOCUMENTS

| | | | |
|---|---|---|---|
| 5,293,629 A | | 3/1994 | Conley et al. |
| 5,655,122 A | * | 8/1997 | Wu .............................. 717/152 |
| 5,794,047 A | * | 8/1998 | Meier ........................... 717/133 |
| 5,797,012 A | * | 8/1998 | Blainey et al. .............. 717/157 |
| 5,862,382 A | * | 1/1999 | Kataoka ....................... 717/131 |
| 5,950,009 A | * | 9/1999 | Bortnikov et al. ........... 717/158 |
| 6,026,234 A | * | 2/2000 | Hanson et al. ............... 717/133 |
| 6,029,004 A | * | 2/2000 | Bortnikov et al. ........... 717/158 |
| 6,070,009 A | * | 5/2000 | Dean et al. .................. 717/130 |
| 6,292,940 B1 | * | 9/2001 | Sato ............................. 717/157 |
| 6,343,376 B1 | * | 1/2002 | Saxe et al. ................... 717/154 |
| 6,817,014 B2 | * | 11/2004 | Hundt et al. ................. 717/159 |
| 7,120,902 B2 | * | 10/2006 | Flanagan et al. ............ 717/130 |
| 7,140,008 B2 | * | 11/2006 | Chilimbi et al. ............ 717/158 |
| 7,168,009 B2 | * | 1/2007 | Darringer et al. ............ 714/38 |
| 7,237,236 B2 | * | 6/2007 | Kershenbaum et al. .... 717/154 |
| 7,240,332 B2 | * | 7/2007 | Berg et al. ................... 717/126 |
| 2003/0172293 A1 | * | 9/2003 | Johnson et al. ............. 713/200 |
| 2004/0088687 A1 | * | 5/2004 | Dalton et al. ............... 717/141 |
| 2005/0015752 A1 | * | 1/2005 | Alpern et al. ............... 717/131 |
| 2005/0081106 A1 | * | 4/2005 | Chang et al. ................. 714/38 |
| 2005/0108562 A1 | | 5/2005 | Khazan et al. |
| 2006/0225056 A1 | * | 10/2006 | Mukkavilli .................. 717/141 |
| 2007/0006194 A1 | * | 1/2007 | Mejri et al. ................. 717/151 |

OTHER PUBLICATIONS

Feng, H, Giffin, J, Juang, Y, Jha, S Lee, W, Miller, B. "Formalizing sensitivity in static analysis for intrusion detection." Security and Privacy, 2004. Proceedings. 2004 IEEE Symposium on May 2004: 194-208.*

* cited by examiner

*Primary Examiner*—Wei Y Zhen
*Assistant Examiner*—Matthew J Brophy
(74) *Attorney, Agent, or Firm*—Trellis IP Law Group, PC

(57) ABSTRACT

Methods and systems are provided for analyzing a source code. The method includes collecting function entry information during the execution of tests on the source codes. The function entry information is then converted into symbolic codes. The function calls are replaced by the elements of the symbolic codes in the source codes. The elements can be in the form of functions. Subsequently, static analysis is performed on the source code by using the mapping between the function calls and the functions in the source code.

19 Claims, 5 Drawing Sheets

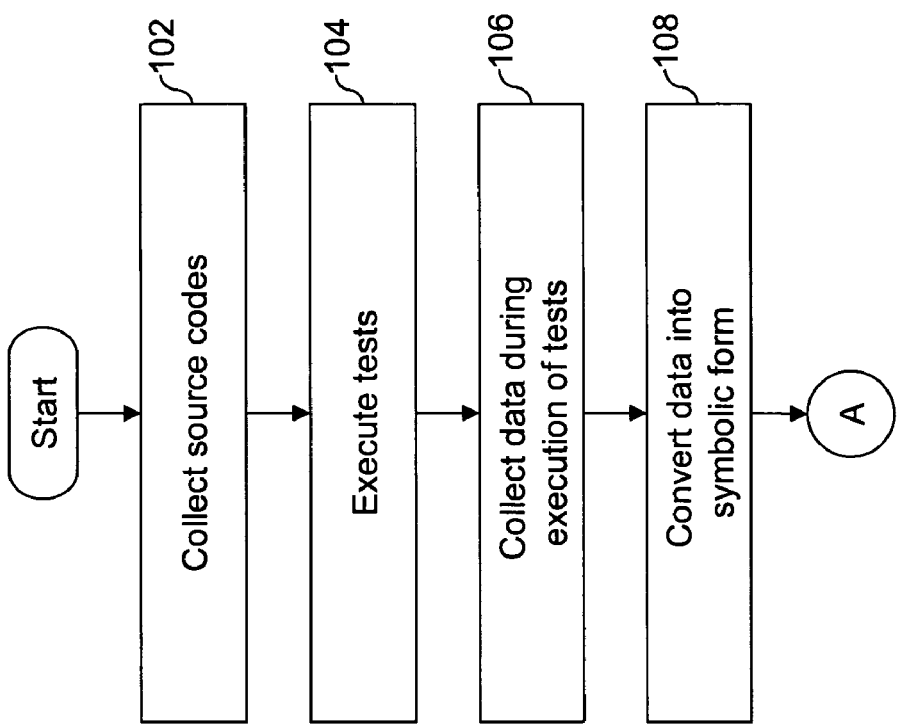

METHOD AND SYSTEM FOR ANALYZING SOURCE CODE

BACKGROUND OF THE INVENTION

1. Field of Invention

The present invention relates, in general, to the field of analysis of source codes. More specifically, the embodiments of the present invention relate to systems and methods for improving the quality of static analysis.

2. Description of the Background Art

Static analysis is a technique used for finding bugs in a source code. Static analysis is the analysis of a source code carried out without executing the source code. Static analysis can provide information about the quality of the source code. In particular, static analysis gives measurements of the characteristics of the source code such as form, structure, content or documentation.

Conventional techniques offer tools performing static analysis for intra-procedural analysis and inter-procedural analysis. However, inter-procedural analysis can be difficult, if mechanisms that establish function calls at runtime are used. Some examples of the mechanisms are indirect function calls, registries, function vectors and jump tables. Functions that are called cannot be determined by the conventional techniques.

Conventional techniques also offer tools performing dynamic analysis. Dynamic analysis is a technique evaluating a system or component based on its behavior during execution. Dynamic analysis can determine the bugs in functions. However, this analysis is very time consuming.

BRIEF DESCRIPTION OF THE DRAWINGS

FIG. 1A and FIG. 1B are flow charts depicting a method for analyzing a source code, in accordance with an exemplary embodiment of the invention.

DETAILED DESCRIPTION OF THE EMBODIMENTS OF THE INVENTION

Various embodiments of the invention provide a method, system, apparatus and machine-readable instructions for analyzing a source code. In various embodiments of the invention, the source code can be a part of Internet Operating System (IOS), embedded system, middleware and the like. The various embodiments of the invention analyze the source code by identifying functions corresponding to the function calls in the source code and subsequently conducting static analysis based on the mapping between the functions and the function calls.

Static analysis is a technique for finding bugs in a source code without executing the source code. An exemplary bug can occur if the square root of a number is equal to some negative number. During static analysis, one or more tests are conducted to test whether the source code passes or fails to generate the desired result. The source code is analyzed on the basis of the results of the tests.

Figure 1B:
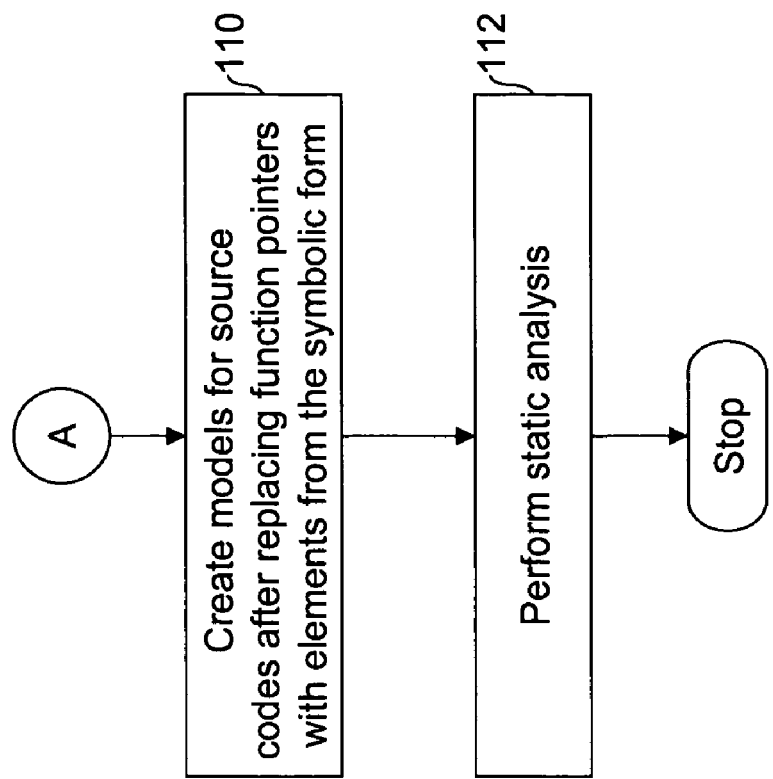

FIG. 1A and FIG. 1B are flow charts describing a method for analyzing a source code, in accordance with an exemplary embodiment of the invention. At step 102, the source code(s) to be analyzed are collected. The source codes may be written in any suitable programming language for example, C, C++, C#, Java, assembly language, etc. The source codes may employ different programming techniques such as procedural or object oriented techniques. The source codes may contain zero or more function calls.

At step 104, tests are executed on the collected source codes. Further, at step 106, data is collected during the execution of the tests. In one embodiment, instrumenting an executable may collect the data, which may be any suitable data, such as by way of example only, function entry information. The function entry information may include caller and caller's caller address. In various embodiments of the invention, the data can be in binary digit format. Thereafter, at step 108, the collected data is converted into a symbolic form. In one embodiment, the symbolic form may be, <file name>:<line number>:<function name>

In various embodiments of the invention, the elements of the symbolic form include the name of the functions corresponding to the function calls in the source code. Exemplary functions include constructors, destructors, process/thread creation system, initialization functions and signal/interrupt handlers. At step 110, the function calls, if any, are replaced by the elements of the symbolic form. Finally, at step 112, static analysis is conducted on the source code, and a model is created based on the static analysis. The model may include important characteristics of a function. The model may be used when a function call is detected.

Figure 2A:
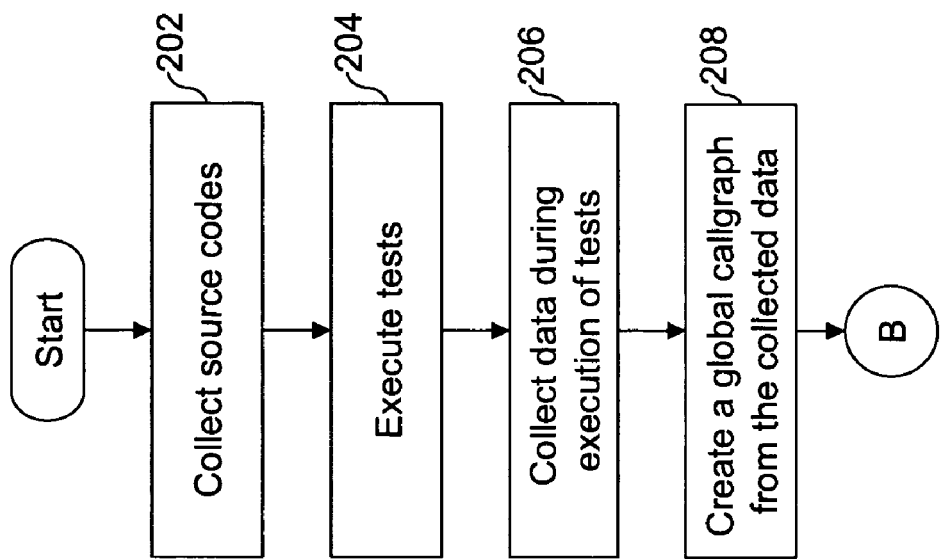
FIG. 2A and FIG. 2B are detailed flow charts depicting a method for analyzing a source code, in accordance with another exemplary embodiment of the invention.
Figure 2B:
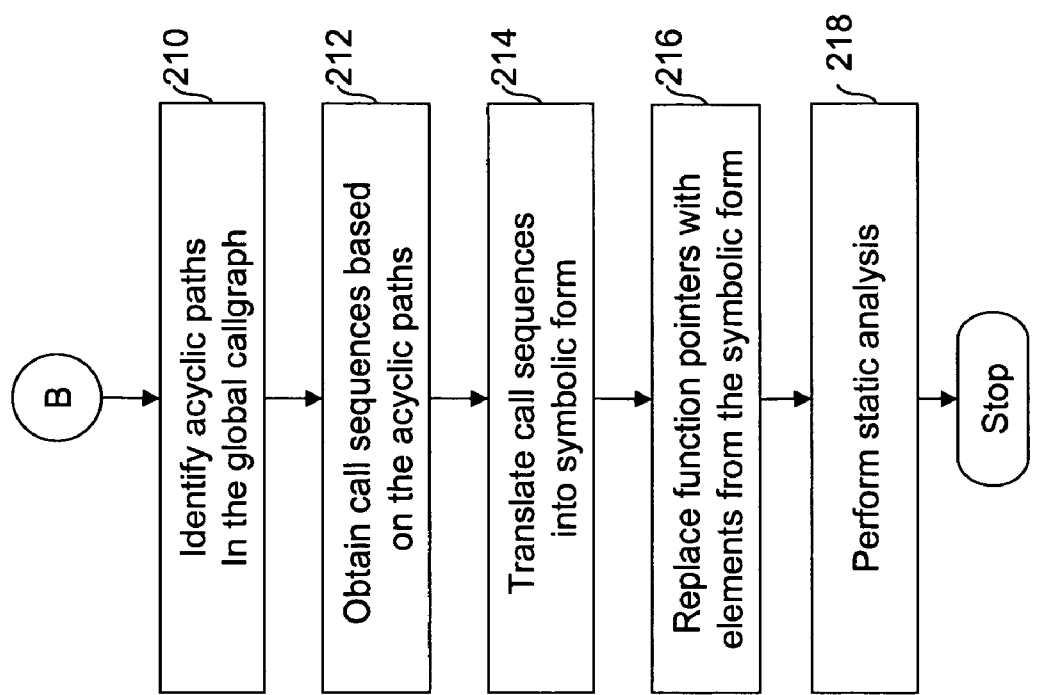

FIG. 2A and FIG. 2B are detailed flow charts depicting a method for analyzing a source code, in accordance with an exemplary embodiment of the invention. At step 202, one or more source codes to be analyzed are collected. At step 204, one or more tests are executed on the source codes. At step 206, data is collected during the execution of tests. In one embodiment, the data may be function entry information. In an embodiment of the invention, the collected data is stored in the form of a data structure. Then, at step 208, a global callgraph is created from the collected data. The global callgraph may be employed in static program analyzers and models dependencies between program constructs, such as functions or modules. The global callgraph may be related with hierarchy charts, as used in several structure design methods, and may capture the dependencies of objects in the program at different levels of abstraction. By way of example only, the global callgraph may represent dependencies between functions within a module or dependencies between modules. The highest level object may correspond to the root mode of the global callgraph.

In various embodiments, the creation of the global callgraph includes transferring the callgraph profile to a host. Subsequently, the host creates the global callgraph. In one embodiment, the host may be a computer, a microcontroller or any data processing unit. At step 210, one or more acyclic paths are identified in the global callgraph. It is to be understood that a directed graph is simple if there is no more than one edge with a given start and end vertices. A path in a directed graph may be defined as a sequence of vertices where each next vertex can be reached by an edge from the preceding one. A path is acyclic if no vertex in it is repeated.

At step 212, all the call sequences that were executed during the tests are obtained based on the identified acyclic paths. In various embodiments, the call sequences may be used to perform analysis such as stack overflow detection, and detection of calls to forbidden functions. Then, at step 214, the call sequences are converted into the corresponding symbolic form. In one embodiment, the call sequences may be converted from the format, <text area address1>..><text area address 2>..><text area address3> into the format,
s1..>s2..>s3 where each of the si is of the form,
<filename>:<line number>:<function name>

At step 216, the function calls are replaced with elements from the symbolic form, i.e., the functions corresponding to the function calls. Finally, at step 218, static analysis is conducted on the source code, and a model is created based on the static analysis.

Figure 3:
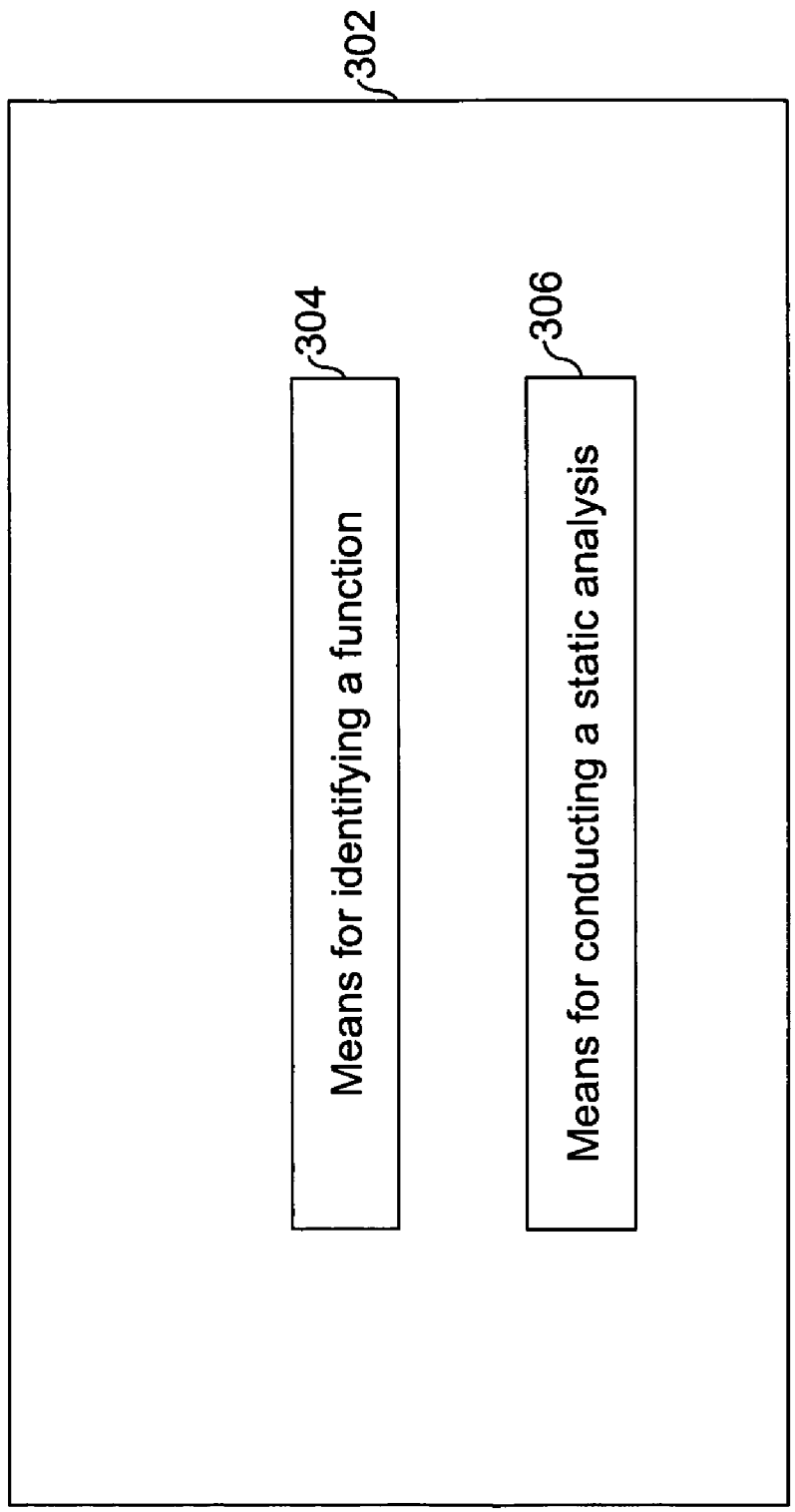
FIG. 3 is a schematic diagram depicting a system for analyzing a source code, in accordance with an exemplary embodiment of the invention.

FIG. 3 is a schematic diagram depicting a system 302 for analyzing a source code 308, in accordance with an exemplary embodiment of the invention. System 302 includes a means for identifying a function 304 and a means for conducting a static analysis 306. Means for identifying a function 304 identifies a function corresponding to the zero or more function calls in source code 308. Means for identifying a function 304 may be software, an embedded circuit and their combination thereof. Means for conducting a static analysis 306 conducts static analysis on source code 308 based on the mapping of the zero or more function calls to the function, as shown in step 112 in FIG. 1 and step 218 in FIG. 2. In one embodiment, means for conducting a static analysis 306 conducts static analysis on a modified model of source code 308. In the modified model, all the function calls may be replaced with elements from the symbolic form, in accordance with the step 108 (in FIG. 1) or step 214 (in FIG. 2). Means for conducting a static analysis 306 may be software or an embedded circuit. Exemplary static analysis tool include inForce and inSight, manufactured by Klocwork Inc.

Embodiments of the present invention have the advantage that the quality of inter-procedural static analysis of source codes is improved. This is achieved by automating the step of identifying the functions corresponding to the function calls. Another advantage is that the embodiments of the present invention takes less time for the analysis of a source code as compared to dynamic analysis. A modified model of the source code may contain characteristics of a function. The creation of the modified model saves the time and effort of reanalyzing a function more than once.

The embodiments of the invention can also help in improving the quality of inter-procedural analysis of the source code that uses indirect function calls. The embodiments of the invention also enhance the quality of intra-procedural analysis. This is achieved by tracing function call at runtime and use the data to modify static analysis models for functions to replace anonymous functions calls with actual functions.

Although the invention has been discussed with respect to specific embodiments thereof, these embodiments are merely illustrative and not restrictive of the invention. Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of the embodiments of the present invention. One skilled in the relevant art will recognize, however, that an embodiment of the invention can be practiced without one or more of the specific details, or with other apparatuses, systems, assemblies, methods, components, materials, parts, and/or the like. In other instances, well-known structures, materials or operations are not specifically shown or described in detail, to avoid obscuring aspects of the embodiments of the present invention.

A "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure or characteristic described in connection with the embodiment is included in at least one embodiment of the present invention, and not necessarily in all embodiments. Therefore, the appearance of the phrases "in one embodiment", "in an embodiment", or "in a specific embodiment" in various places throughout this specification do not necessarily refer to the same embodiment. Furthermore, the particular features, structures or characteristics of any specific embodiment of the present invention may be combined in any suitable manner with one or more other embodiments. It is to be understood that other variations and modifications of the embodiments of the present invention, described and illustrated herein, are possible in light of the teachings herein and are to be considered as part of the spirit and scope of the present invention.

Further, at least some of the components of an embodiment of the invention may be implemented by using a programmed general-purpose digital computer, by means of application-specific integrated circuits, programmable logic devices, field-programmable gate arrays, or by using a network of interconnected components and circuits. Connections may be wired, wireless, by modem, and so forth.

It will also be appreciated that one or more of the elements depicted in the drawings/figures can also be implemented either in a separate or integrated manner, or even removed or rendered inoperable in certain cases, as is useful, in accordance with a particular application.

Additionally, any signal arrows in the drawings/figures should be considered only as exemplary, and not limiting, unless otherwise specifically mentioned. Combinations of components or steps will also be considered as being noted, where the terminology renders the ability to separate or combine as unclear.

As used in the description herein and throughout the claims that follow, 'a', 'an', and 'the' includes plural references, unless the context clearly dictates otherwise. Also, as used in the description herein and throughout the claims that follow, the meaning of 'in' includes 'in' as well as 'on', unless the context clearly dictates otherwise.

The foregoing description of the illustrated embodiments of the present invention, including what is described in the abstract, is not intended to be exhaustive or limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of the illustrated embodiments of the present invention, and are to be included within the spirit and scope of the present invention.

Therefore, while the present invention has been described herein with reference to particular embodiments thereof, latitude of modification and various changes and substitutions are intended in the foregoing disclosures. It will be appreciated that in some instances some features of the embodiments of the invention will be employed without the corresponding use of other features, without departing from the scope and spirit of the invention, as set forth. Therefore, many modifications may be made, to adapt a particular situation or material to the essential scope and spirit of the present invention. It is intended that the invention is not limited to the particular terms used in the following claims, and/or to the particular embodiment disclosed, as the best mode contemplated for carrying out this invention. The invention will include any and all embodiments and equivalents falling within the scope of the appended claims

What is claimed is:

1. A method for analyzing a source code, the method comprising:
    collecting function call information by executing an instrumented version of the source code, the function call information being a sequence of function calls that were called in executing the instrumented version, the function call information in a first form collected from executing the instrumented version;
    generating symbolic forms of the sequence of function calls in the source code using the function call information by converting from the first form to a symbolic form;
    replacing, by a computing device, the sequence of function calls by inserting a sequence the symbolic forms into the source code at one or more points in the source code in place of the sequence of function calls, the sequence of the symbolic forms representing functions corresponding to the function calls for the call sequence collected from executing the instrumented version; and
    conducting a static analysis on the source code by using the inserted symbolic form.

2. The method in accordance with claim 1, further comprising:
    collecting a plurality of source codes to be analyzed;
    executing tests associated with the plurality of source codes;
    collecting data during the execution of the tests;
    converting the collected data into a symbolic form; and
    replacing function calls with elements from the symbolic form.

3. The method in accordance with claim 1, wherein the step of conducting static analysis comprises capturing characteristics of a function in a model.

4. The method in accordance with claim 2, wherein the collected data includes function entry information.

5. The method in accordance with claim 2, wherein converting the collected data further comprises
    creating a global callgraph from the collected data;
    identifying zero or more acyclic paths in the global callgraph;
    obtaining a sequence of function calls based on the identified acyclic paths; and
    translating the sequence of function calls into symbolic form.

6. The method in accordance with claim 5, wherein the step of obtaining the sequence of function calls further comprises performing stack overflow detection.

7. The method in accordance with claim 4, wherein the step of obtaining the sequence of function calls further comprises detecting calls to forbidden functions.

8. The method in accordance with claim 4, wherein the collected data is stored in a data structure.

9. An apparatus for analyzing a source code, the apparatus comprising:
    a processing system including a computer processor coupled to a display and user input device;
    a computer-readable storage device including instructions executable by the processor comprising one or more instructions for:
    collecting function call information by executing an instrumented version of the source code, the function call information being a sequence of function calls that were called in executing the instrumented version, the function call information in a first form collected from executing the instrumented version;
    generating symbolic forms of a the sequence of function calls in the source code using the function call information by converting from the first form to a symbolic form;
    replacing, by the computer processor, the sequence of function calls by inserting a sequence the symbolic forms into the source code at one or more points in the source code in place of the sequence of function calls, the sequence of the symbolic forms representing functions corresponding to the function calls for the call sequence collected from executing the instrumented version; and
    conducting a static analysis on the source code by using the inserted symbolic form.

10. A computer-readable storage device for analyzing a source code, the computer-readable storage device including instructions executable by a computer processor for:
    collecting function call information by executing an instrumented version of the source code, the function call information being a sequence of function calls that were called in executing the instrumented version, the function call information in a first form collected from executing the instrumented version;
    generating symbolic forms of a the sequence of function calls in the source code using the function call information by converting from the first form to a symbolic form;
    replacing, by the computer processor, the sequence of function calls by inserting a sequence the symbolic forms into the source code at one or more points in the source code in place of the sequence of function calls, the sequence of the symbolic forms representing functions corresponding to the function calls for the call sequence collected from executing the instrumented version; and conducting a static analysis on the source code by using the inserted symbolic form.

11. The computer-readable storage device in accordance with claim 10 further comprising one or more instructions for:

collecting a plurality of source codes to be analyzed;

executing tests associated with the plurality of source codes;

collecting data during the execution of the tests;

converting the collected data into a symbolic form; and replacing the zero or more function calls with elements from the symbolic form.

12. The computer-readable storage device in accordance with claim 10, further comprising one or more instructions for:

capturing characteristics of a function in a model.

13. The computer-readable storage device in accordance with claim 11, further comprising one or more instructions for:

creating a global callgraph from the collected data;

identifying zero or more acyclic paths in the global callgraph;

obtaining a sequence of function calls based on the identified acyclic paths; and translating the sequence of function calls into symbolic form.

14. The computer-readable storage device in accordance with claim 13, wherein the one or more instructions for obtaining the sequence of function calls further comprise performing stack overflow detection.

15. The computer-readable storage device in accordance with claim 12, wherein the one or more instructions for obtaining the sequence of function calls further comprise detecting calls to forbidden functions.

16. The computer-readable storage device in accordance with claim 12, wherein the collected data is stored in a data structure.

17. The method of claim 1, further comprising modifying a model for the source code based on the static analysis, the modified model including characteristics of a function; and re-running the static analysis, wherein the re-run static analysis uses the characteristics of the function to evaluate the function instead of re-evaluating the function.

18. The apparatus of claim 9, further comprising modifying a model for the source code based on the static analysis, the modified model including characteristics of a function; and re-running the static analysis, wherein the re-run static analysis uses the characteristics of the function to evaluate the function instead of re-evaluating the function.

19. The computer-readable storage device of claim 10, further comprising modifying a model for the source code based on the static analysis, the modified model including characteristics of a function; and re-running the static analysis, wherein the re-run static analysis uses the characteristics of the function to evaluate the function instead of re-evaluating the function.

* * * * *

UNITED STATES PATENT AND TRADEMARK OFFICE
CERTIFICATE OF CORRECTION

PATENT NO. : 7,661,097 B2
APPLICATION NO. : 11/099821
DATED : February 9, 2010
INVENTOR(S) : Lakshmankumar Mukkavilli It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 795 days.

Signed and Sealed this

Twenty-eighth Day of December, 2010

David J. Kappos
*Director of the United States Patent and Trademark Office*